United States Patent [19]

Tsai

[11] Patent Number: 4,747,772

[45] Date of Patent: May 31, 1988

[54] BURNER DESIGN FOR MELTING GLASS BATCH AND THE LIKE

[75] Inventor: Yih-Wan Tsai, Pittsburgh, Pa.

[73] Assignee: PPG Industries, Inc., Pittsburgh, Pa.

[21] Appl. No.: 16,152

[22] Filed: Feb. 18, 1987

Related U.S. Application Data

[62] Division of Ser. No. 830,783, Feb. 19, 1986, Pat. No. 4,671,765.

[51] Int. Cl.[4] .......................... F23D 14/62
[52] U.S. Cl. .................. 431/354; 431/160; 431/174; 239/132.3; 239/423; 239/566
[58] Field of Search ............ 239/566, 132.1, 132.3, 239/423; 431/178, 353, 354, 160

[56] References Cited

U.S. PATENT DOCUMENTS

| | | | |
|---|---|---|---|
| 2,384,510 | 9/1945 | Volkman | 126/116 |
| 2,941,587 | 6/1960 | Hagy et al. | 158/99 |
| 3,127,156 | 3/1964 | Shepherd | 263/43 |
| 3,297,411 | 1/1967 | Dear | 23/284 |
| 3,302,596 | 2/1967 | Zinn | 110/22 |
| 3,515,529 | 6/1970 | Love et al. | 65/27 |
| 3,563,683 | 2/1971 | Hess | 431/160 |
| 3,567,202 | 3/1971 | Mercatoris et al. | 266/34 |
| 3,680,785 | 8/1972 | Miller | 239/132.3 |
| 4,381,934 | 5/1983 | Kunkle et al. | 65/135 |
| 4,386,737 | 6/1983 | Antonov et al. | 239/566 |
| 4,391,581 | 7/1983 | Daman et al. | 431/160 |
| 4,474,120 | 10/1984 | Adrian et al. | 110/261 |
| 4,496,315 | 1/1985 | Savolskis | 432/30 |
| 4,496,387 | 1/1985 | Heithoff et al. | 65/335 |
| 4,547,146 | 10/1985 | Tanaka et al. | 431/180 |
| 4,556,384 | 12/1985 | Laurenceau et al. | 431/160 |
| 4,671,765 | 6/1987 | Tsai | 432/13 |

FOREIGN PATENT DOCUMENTS

0167447A1  6/1985  France .

Primary Examiner—Carroll B. Dority, Jr.
Attorney, Agent, or Firm—Andrew C. Siminerio

[57] ABSTRACT

A multi-outlet burner for heating material. Nozzles are positioned along a longitudinally extending portion of the burner that generally parallels the material surface. Combustion gas and fuel are combined at each nozzle to produce a plurality of flames that are directed in a sweeping direction over the surface.

16 Claims, 4 Drawing Sheets

BURNER DESIGN FOR MELTING GLASS BATCH AND THE LIKE

This is a division of application Ser. No. 830,783, filed Feb. 19, 1986, and now U.S. Pat. No. 4,671,765.

BACKGROUND OF THE INVENTION

1. Field of the Invention

This invention relates to burners and, in particular, to multiple nozzle burner construction.

2a. Technical Considerations

Continuous glass melting processes conventionally entail depositing pulverulent batch materials into a pool of molten glass maintained within a tank-type melting furnace and applying thermal energy until the materials are melted into a pool of molten glass. A melting tank conventionally contains a relatively large volume of molten glass so as to provide sufficient residence time for currents in the molten glass to effect some degree of homogenization before the glass is discharged to a forming operation. These recirculating flows in a tank-type melter may result in inefficient use of thermal energy. Conventional overhead radiant heating is inefficient in that only a portion of its radiant energy is directed towards the material being melted.

As an alternative to conventional tank-type glass melting furnaces as described above, U.S. Pat. No. 4,381,934 to Kunkle and Matesa discloses an intensified batch liquefaction process in which large volumes of batch are efficiently liquefied in a relatively small liquefaction vessel. This type of process, particularly when using intensified heat sources, produces relatively small volumes of high temperature exhaust gas. Heat from this exhaust gas may be recovered and used to directly heat a batch stream feeding the liquefaction vessel so as to improve the overall efficiency of the process.

In heating the batch material for liquefaction, it is desirable to get maximum coverage of the exposed batch within the furnace with the burners so as to use the heat efficiently. In positioning the burner to effectively heat the batch layer in a heating vessel as disclosed in U.S. Pat. No. 4,381,934, there are several factors to be considered. When the flame from a burner is too close to the batch layer, the impact of the flame may cause the layer to become unstable. As a result, the layer may slough downwardly into the vessel causing irregularities in the batch layer thickness and undesirable product. Furthermore, the resulting turbulence may result in an increase in particulate entrainment in the burner exhaust stream. Another factor to be considered is that the flame should not be aimed directly towards the upper region of the batch layer because the intense heat may adversely affect refractory materials in the vicinity. In addition, if the burner flames have to travel an excessive distance before heating the wall, thermal efficiency is lost.

To more effectively heat a batch layer, additional burners can be positioned to provide better flame distribution in the heating vessel along the batch layer. Although this would produce better flame coverage, such an alternative would complicate the heating process by requiring additional burner hardware and the corresponding tooling, maintenance, and cooling requirements.

As an alternative, a single burner with multiple outlets could be used to reduce the number of burners while maintaining an effective flame distribution. The single burner could spread the burner flames over a batch layer without requiring additional tooling or maintenance coats. The multi-nozzle burner could be positioned near the batch layer and its nozzle could be set to direct the burner flames in a sweeping action over the batch layer rather than directly at the batch layer. The resulting multi-flame sweeping burner could distribute the heat over the batch layer while reducing turbulence due to the flame impact on the layer.

It would be advantageous to have a multi-outlet burner that could distribute its heating flames over the batch layer so as to maximize transfer of heat to the batch material while reducing direct impingement by the flames on the batch and surrounding refractory.

2b. Patents of Interest

U.S. Pat. No. 3,127,156 to Shephard teaches a burner with a controllable flame position. A series of concentric pipes separate the flow of oxygen, air, fuel, and water along the length of the burner. There are two annular passages provided for the water used to cool the burner. Partitions in the annular passages ensure that the water enters at an inlet fitting and flows the length of the burner along one side before it returns along the other side of the burner to an outlet fitting. The burner has a single flame outlet at the tip of the burner.

U.S. Pat. No. 3,515,529 to Love et al. teaches a side discharge burner for use in a regenerative type glass melting furnace. Cooling fluid is introduced into a chamber extending the length of the burner. The burner is supplied with a fluid fuel, such as fuel oil, under pressure, without the introduction of pressurized air as an atomizing means. The burner includes a single outlet firing from the side of the burner.

U.S. Pat. No. 4,391,581 to Daman et al. teaches a burner for injecting fuel into passages for heated combustion air connecting the checkers with the parts of a regenerative-type glass melting furnace. A single central tube directs fuel, such as natural gas, through a water cooled jacket and out a single nozzle into the air passage tunnels. An angled tip portion is cooled by the flow of water through a cooling jacket.

SUMMARY OF THE INVENTION

An object of this invention is to provide a burner with multiple outlets to spread the flames from a burner over a layer of material for better heat distribution. An outer casing houses fuel and oxygen containing gas conduits that extend the length of the casing. Openings in the conduits allow the fuel and gas to combine in mixing chambers along the length of the burners. Nozzles at the mixing chambers direct the resulting flame in a predetermined direction. A coolant conduit, housed within the casing and extending the length of the burner, circulates coolant within the casing to cool the burner. In one embodiment of the invention, a first portion of the burner positions the burner within a heating vessel and a second portion of the burner includes the burner nozzles. The two portions can be angularly affect from one another.

The multiple nozzle burner taught in this invention spreads the flames over a surface to provide more effective heating than a single outlet burner. The nozzles are positioned on a longitudinally extending portion of the burner, which can extend in any direction. As a result, the burner can conform to the surface it is heating. For example, if the surface is curved, the extending portion can substantially parallel the surface so that the multiple nozzles can more evenly distribute the burner flame. In addition, the nozzles of the burner in the present invention can be positioned to direct the flame in a sweeping direction over the surface rather than directly at the surface so as to reduce flame impact and maintain surface stability during heating. Since the burners in the present invention can replace several single outlet burners and still provide effective heat distribution, there is less equipment and associated maintenance as well as reduced burner access requirements and a simplified heating arrangement.

Another object of the invention is to provide a multi-flame oxygen/fuel burner for heating a surface encircling a central cavity. An elongated portion of the burner extends into the cavity and nozzles spaced along this portion direct the burner flames towards the surface.

DETAILED DESCRIPTION OF THE INVENTION

This invention, as presented, is preferably used in the melting process taught in U.S. Pat. No. 4,381,934 to Kunkle et al. but can be used in any heating and/or melting process which uses heat sources such as gas burners, where distribution of the heat on the impacted material is of prime importance.

In a batch liquefaction process as described in U.S. Pat. No. 4,381,934 which teachings are hereby incorporated by reference, batch is deposited in a liquefaction vessel which is adapted to apply intense heat to the batch in a relatively small space to rapidly convert the batch to a liquefied state. Liquefied batch flows out of the vessel into a connecting vessel.

Figure 1:
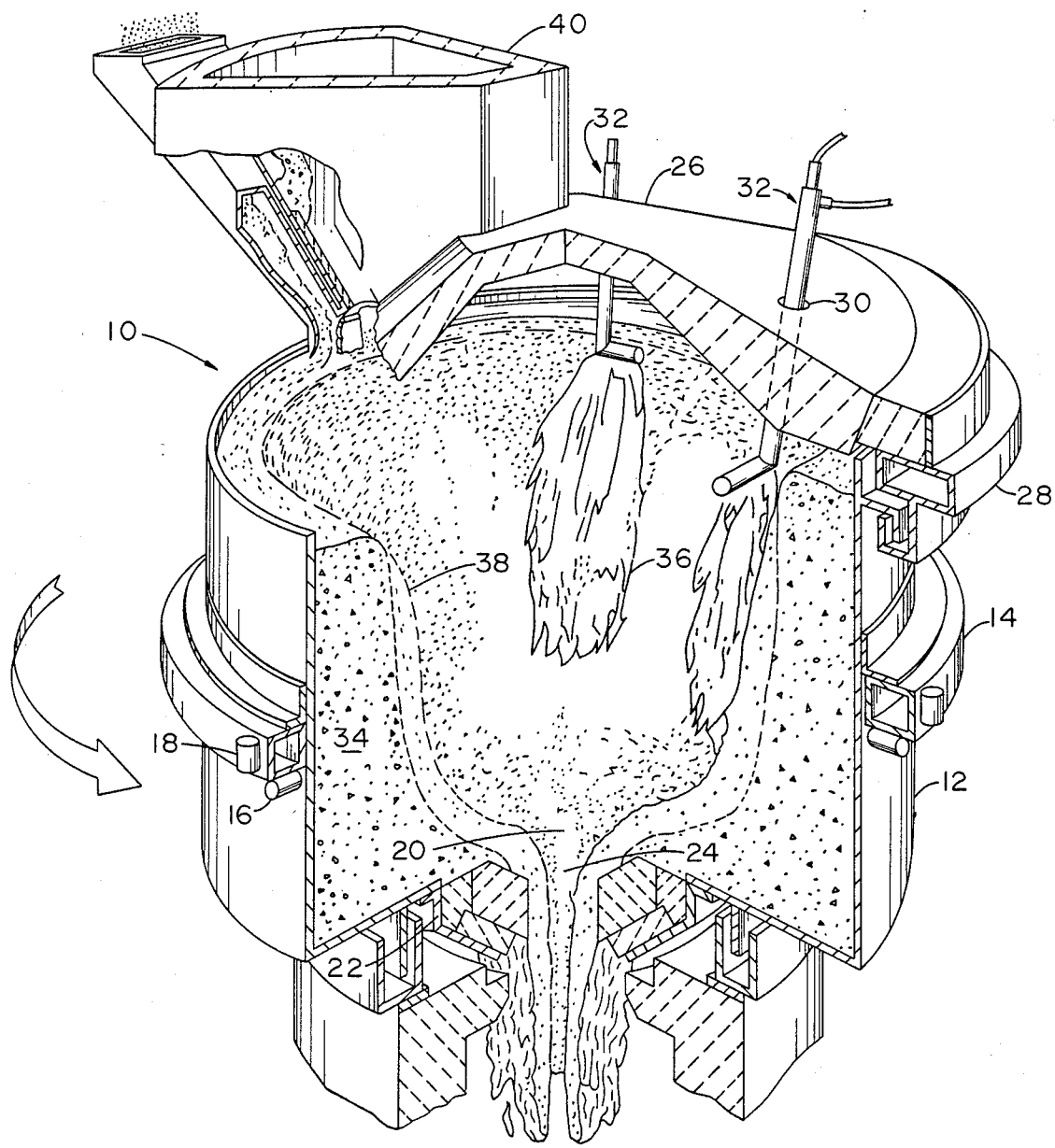
FIG. 1 is an isometric cut away view, with portions removed for clarity of a liquefaction vessel with burners in accordance with the preferred embodiment of the present invention.
Figure 3:
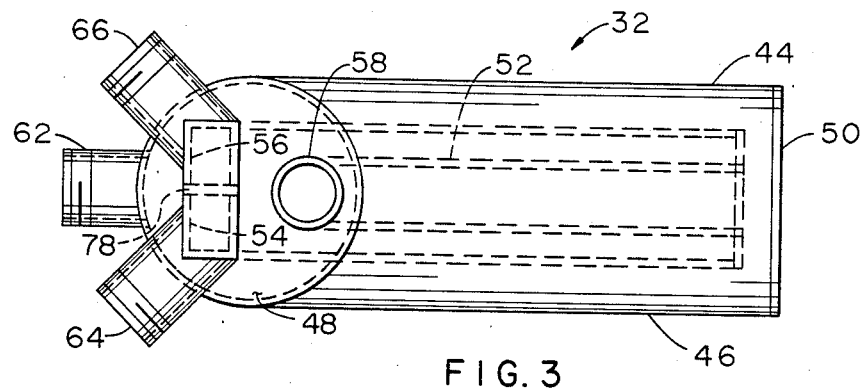
FIG. 3 is a top view of the burner embodiment of FIG. 2.

FIG. 1 illustrates a liquefaction vessel 10 similar to the type disclosed in U.S. Pat. No. 4,496,387 to Heithoff et al. which teachings are hereby incorporated by reference. A drum 12 that may be fabricated of steel is supported on a circular frame 14 which, in turn, is mounted for rotation on a plurality of support rollers 16 and aligning rollers 18, about a generally vertical axis corresponding to the centerline of the drum 12. A batch outlet assembly 20 below the drum 12 includes the bushing 22 having an open center 24. A lid 26 is provided above the drum 12 and may be support by way of a frame 28. The lid 26 may include at least one opening 30 for inserting a burner 32. In the preferred embodiment, the lid 26 includes openings for a plurality of burners 32 and is composed of a ceramic refractory material, but the lid may be any high temperature resistant material, e.g. high temperature resistant steel.

Within the liquefaction vessel 10, a stable layer of unmelted batch 34 is maintained on the walls of the drum 12 encircling the central cavity within which combustion takes place, as shown in FIG. 1. The flames 36 from the burners 32 causes a surface portion 38 of the batch 34 to become liquefied and flow downwardly through the bottom opening 24 of the outlet assembly 20. The liquefied batch then flows out of the liquefaction vessel 10 and may be collected in a vessel (not shown) below the liquefaction vessel 10 for further processing as needed. Exhaust gases can escape downwardly through bottom opening 24 or upwardly through an opening in the lid 26 and into an exhaust outlet 40.

Figure 4:
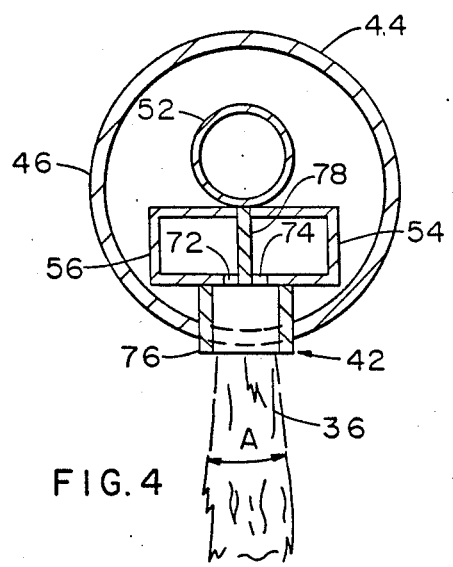
FIG. 4 is a cross-sectional view through lines 4—4 of FIG. 2 showing gas, fuel, and cooling conduits and nozzle arrangement.
Figure 5:
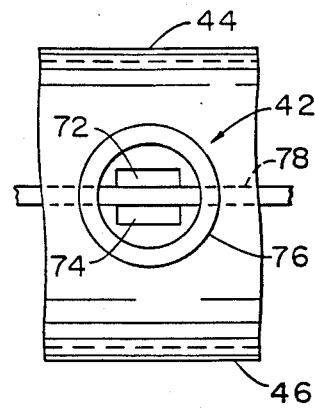
FIG. 5 is a bottom view of a nozzle portion of the embodiment of the burner shown in FIG. 2.

Although not limiting in the present invention, the burner 32 as shown in FIGS. 2, 3, 4 and 5 preferably has an L-shaped configuration with a plurality of nozzles 42 along its extended leg portion 44. The extended leg portion 44 provides a desirable distribution of the burner flames 36, as will be discussed later. Specifically referring to FIG. 2, the burner 32 further includes an outer casing 46 with end plates 48 and 50 surrounding a conduit 52, combustion gas conduit 54 and a fuel conduit 56 to form a chamber to remove coolant entering the burner 32 by way of conduit 52. It is to be understood that subsequent references to combustion gas includes both pure oxygen and oxygen containing gas as well as any other gas that will support combustion with the fuel. To protect the burner 32 from the high temperature environment of the heating vessel 10, the coolant, preferably but not limited to water, enters the burner 32 through inlet 58, travels the length of conduit 52 and exits at open end 60. The coolant fills the outer casing 46 and flows therethrough exiting the burner 32 at outlet 62. Gas and fuel enter the burner 32 through inlets 64 and 66 and pass through are kept separated by conduits 54 and 56, respectively. End plates 68 and 70 seal the ends of the conduits to isolate the fuel and gas from the coolant moving to the outlet 62. Referring to FIGS. 4 and 5, openings 72 in gas conduit 54 and openings 74 in fuel conduit 56 allow the gas and fuel to mix at the nozzles 42. Each tube 76 forms a mixing chamber at the nozzle 42 for the gas/fuel mixture and directs it in the desired direction. Because the burner 32 is cooled by a coolant circulated through conduit 52 and casing 46, all weldments and other connecting or attaching arrangements are watertight. Due to the high temperature and corrosive environment, the components of the burners are preferably stainless steel but can be any type of material that can operate for a prolonged period within that environment.

In the preferred embodiment conduits 54 and 56 are rectangular with a common wall plate 76 as shown in FIG. 4 but it is understood that other conduit configurations can be used. For example, it would obvious to one skilled in the art that a pair of rectangular tube sections placed wall-to-wall or other similar configurations would give an equivalent structure. While the openings 72 and 74 as shown in FIG. 5 are rectangular, the openings can be of any shape and size that provides a desired gas/fuel mixture and flame characteristics, e.g., round, oval, rectangular with curved end portions, etc. Moreover, the openings 72 and 74 need not be of the same size or configuration at any one nozzle, and further, the openings can vary from nozzle to nozzle.

Figure 6:
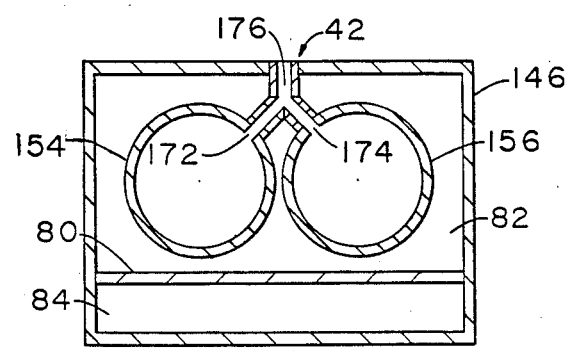
FIG. 6 is a cross-sectional view of as alternate embodiment of the burner.

It should be understood that other fuel, gas and coolant conduit arrangements are included within the teachings of this invention. For example, FIG. 6 shows a rectangular casing 146, surrounding combustion gas conduit 154 and fuel conduit 156. Conduits 154 and 156 are generally circular in cross-section. Openings 172 and 174 in gas conduit 154 and fuel conduit 156 respectively allow the gas and fuel to combine in mixing area 176. Plate 80 divides the casing 146 and provides a coolant inlet passageway 82 and coolant outlet passageway 84 through which the coolant flows to cool the burner 32.

The length of the tube 76 combined with the size and configurations of the openings 72 and 74 will determine the spread angle A of the flame 36 from the burner 32 as shown in FIG. 4. The shape of the tube 76 can be modified, for example, to a conical section to further modify the spread angle. Although not limiting in the present invention, the spread angle is preferably about 10° to 15°. This spread angle concentrates the burner flames 36 and better directs them over the batch layer so that the total flame is closer to surface 38 of batch 34 and it can more efficiently heat the batch material.

The burner arrangement shown in FIG. 1 illustrates how the flame coverage is directed so as to spread the flames 36 over the surface portion 38 of the batch 34 at an acute angle between the flame and batch 34. As the angle between the burner flame and surface portion 36 is reduced from 90°, the flame is directed to pass along the batch surface rather than directly impact it. This arrangement effectively transfers heat to the batch for liquefaction because more of the batch surface is directly exposed to the flames 36 but does not effect the stability of the batch 34.

Figure 7:
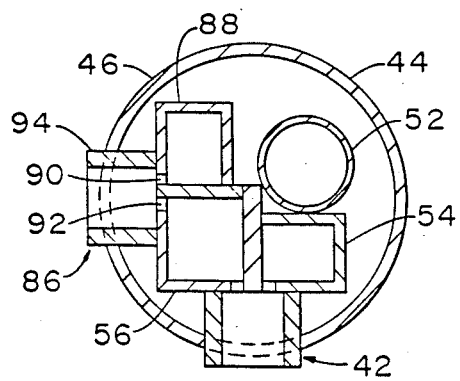
FIG. 7 is a cross-sectional view, similar to FIG. 4 of an alternate burner showing a multi-directional nozzle arrangement.
Figure 8:
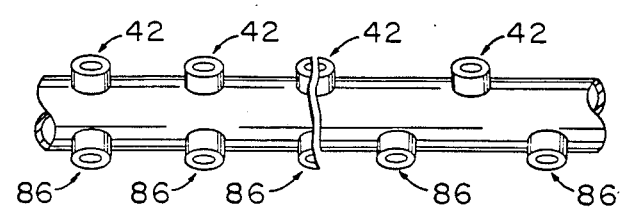
FIG. 8 is a side view of the burner of FIG. 7 showing various nozzle positions.

FIG. 7 shows a cross-section of a burner 32 that is similar to FIG. 4, but shows a second nozzle 86 along with nozzle 42. The nozzles 42 and 86 are shown to be approximately at right angles to one another but can be at any appropriate angle required to get the desired burner configuration. Casing 46 encloses conduits 52, 54 and 56 along with an additional fuel conduit 88. Opening 90 in fuel conduit 88 and additional opening 92 and gas conduit 54 feed tube section 94 of the nozzle 86. It is obvious that as an alternative, conduits 56 and 88 could be the combustion gas conduits and conduit 54 could be the fuel conduit. The nozzles can be positioned in groups of pairs as shown in the left hand portion of FIG. 8 or staggered as shown in the right hand portion of FIG. 8. This multiple nozzle arrangement can be used in any desired burner configuration.

Figure 9:
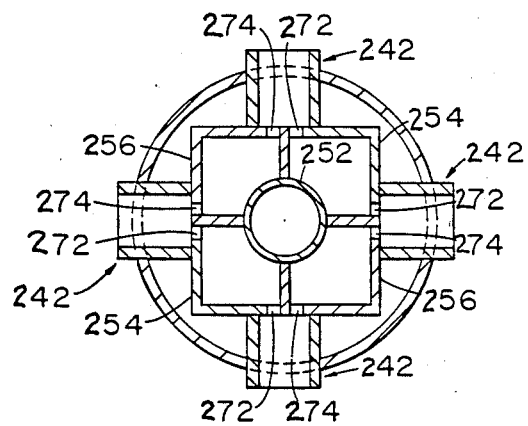
FIG. 9 is a cross-sectional view similar to FIG. 4 of another alternate embodiment of the burner.

Referring to FIG. 9 an additional fuel or gas conduit could be added to the burner 32 to provide additional nozzle positions about the burner circumference. Specifically, coolant conduit 252 passes through the pairs of gas conduits 254 and fuel conduits 256. Openings 272 in the gas conduits and 274 in the fuel conduits allow the gas and fuel to mix at nozzles 242.

Figure 2:
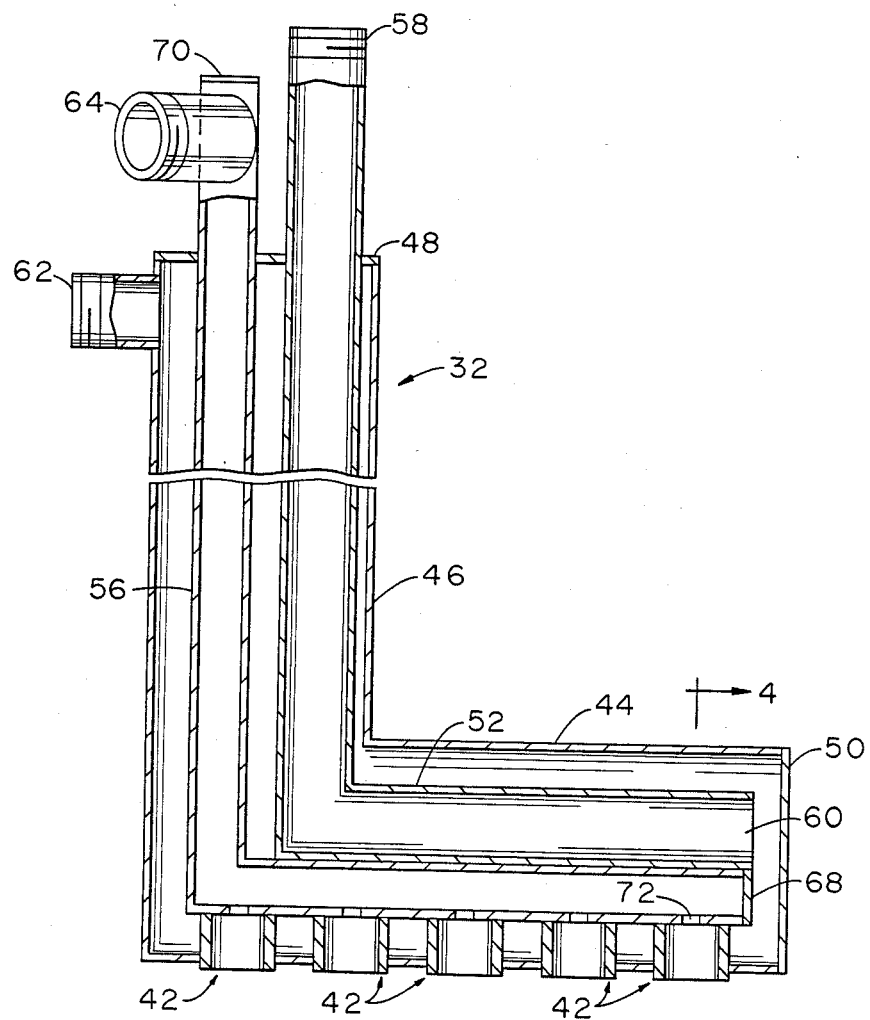
FIG. 2 is a cross-sectional view of a preferred embodiment of a burner of the type shown in FIG. 1 showing gas, fuel, and cooling conduits and nozzle arrangement.
Figure 10:
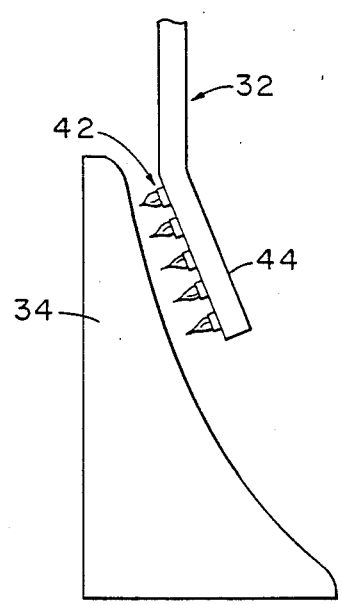
FIGS. 10 and 11 are side views of alternate burner arrangements positioned adjacent a surface to be heated and showing various burner flame configurations.
Figure 11:
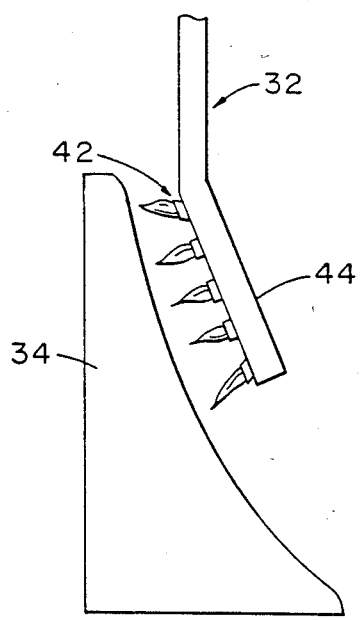

The internal construction of the burner shown in FIGS. 2 through 5 is also applicable to other burner configurations such as, but not limited to, those shown in FIGS. 10 and 11. Rather than having the nozzles 42 in a horizontal alignment along leg portion 44 as shown in FIG. 2, the nozzles 42 can be spaced vertically relative to each other and, if desired, to generally conform to the exposed surface of the batch 34. If the heating operation allows, the nozzle 42 may be oriented to direct the flames 36 directly at the material surface. As an alternative and specifically referring to FIG. 11, the nozzles 42 may also direct the flames 36 from the nozzles 42 in a non-normal direction relative to the longitudinal axis of the burner 32. In addition, nozzles 86 can be added and/or nozzle spacing can be varied to affect desired changes in the burner configuration.

With continued reference to FIG. 11, in a melting arrangement where layer stability is an important consideration, the flame size at each nozzle of the burner 32 may be varied to provide a smaller directly impacting flame at the upper portions of the batch wall, and larger sweeping flames along its lower portions, thus maintaining wall stability.

Figure 12:
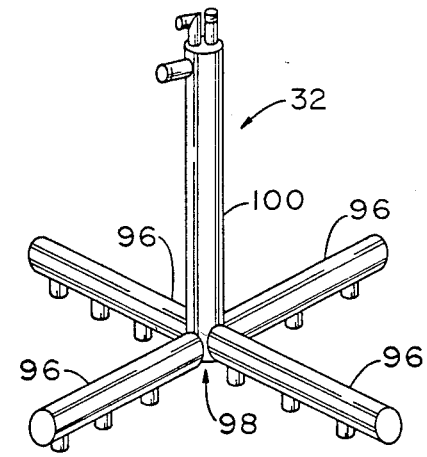
FIG. 12 is an isometric view of an alternate burner arrangement.

It should be appreciated that other burner configurations using the burner and nozzle design of the present invention can be adapted for use in any heating and/or melting operation. Since the nozzles 42 are located along a generally longitudinally extending portion of the burner 32, such as leg portion 44 shown in FIG. 2, the extending portion can be of any configuration required to provide efficient and effective heating. For example, in a melting process as previously discussed, a complete ring burner within the vessel 10 could be used to provide a continuous curtain of sweeping flames along the batch surface. Alternatively, the burner 32 could have a plurality of extending portions as shown in FIG. 12. Portions 96 extend outwardly from a common hub 98 at one end of main member 100 to heat additional area from a single central gas and fuel source. In addition, the portions 140 can extend outwardly from hub 142 at different levels to form a multi-nozzle, multi-level burner.

The form of the invention described and illustrated herein represents a description of illustrative preferred embodiments thereof. It is understood that various changes may be made without departing from the gist of the invention defined in the claims that follows.

I claim:

1. A burner comprising:
   a fuel conduit positioned along a first longitudinally extending axis, said fuel conduit having a plurality of first openings spaced along said fuel conduit;
   a combustion gas conduit positioned along a second longitudinally extending axis generally paralleling said first axis wherein each of said conduits are mutually exterior to the other of said conduits, said second conduit having a plurality of second openings spaced along said combustion gas conduit such that each of said second openings is paired with a corresponding first oepning; and
   means forming mixing chambers spaced along said conduits at each of said pairs of openings to combine said fuel and gas.

2. The burner as in claim 1 further including an additional fuel conduit exterior to said other conduits, said additional fuel conduit having a plurality of third openings spaced along said additional fuel conduit and said combustion gas conduit having a plurality of fourth openings spaced along said combustion gas conduit wherein each of said fourth openings is paired with a corresponding third opening and further including additional mixing chambers spaced along said combustion gas conduit and additional fuel conduit at each of said pairs of third and fourth openings to combine said fuel and gas.

3. The burner as in claim 1 further including an additional combustion gas conduit exterior to said other conduits, said additional gas conduit having a plurality of third openings spaced along said additional gas conduit and said fuel conduit having a plurality of fourth openings spaced along said fuel conduit wherein each of said fourth openings is paired with a corresponding third oepning and further including additional mixing chambers spaced along said additional gas conduit and said fuel conduit at each of said pairs of third and fourth openings to combine said fuel and gas.

4. The burner as in claim 1 wherein said mixing chambers include tube portions extending from said conduits to direct flames resulting from the combination of said fuel and gas in each of said mixing chamber in a predetermined direction.

5. The burner as in claim 4 wherien said mixing chambers are circumferentially spaced along said burner.

6. The burner as in calim 1 wherein the size and/or shape of said first and second openings vary.

7. The burner as in claim 1 wherein said fuel and combustion gas conduits each include a first and second portion wherein said second portion of each of said conduits is angularly offset from said first portion of said respective conduits and further wherein said mixing chambers are positioned along said second portions of said conduits.

8. The burner as in claim 1, wherein said combustion gas is an oxygen containing gas.

9. The burner as in claim 1 further including means to control the temperature of said burner.

10. The burner as in claim 9 wherein said control means includes an outer casing enclosing said conduits, a coolant intake conduit within said casing to direct coolant along the length of said burner and a coolant outlet wherein said coolant flows through said intake conduit exiting same at an opening in said coolant conduit, filling said casing with coolant, said coolant being removed from said burner through said coolant outlet.

11. The burner as in claim 4 wherein said fuel and combustion gas conduits each include a first and second portion wherein said second portion of each of said conduits is angularly offset from said first portion of said respective conduits and further wherein said mixing chambers are positioned along said second portions of said conduits.

12. The burner as in claim 11 wherein the size and/or shape of said first and second openings vary.

13. The burner as in claim 12 further including means to control the temperature of said burner.

14. The burner as in claim 13 wherein said control means includes an outer casing enclosing said conduits, a coolant intake conduit within said casing to direct coolant along the length of said burner and a coolant outlet wherein said coolant flows through said intake conduit exiting same at an opening in said coolant conduit, filling said casing with coolant, said coolant being removed from said burner through said coolant outlet.

15. A burner comprising;
at least one fuel conduit positioned along a first longitudinally extending axis, said fuel conduit having a plurality of first openings spaced along said fuel conduit;
at least one gas conduit positioned along a second longitudinally extending axis generally paralleling said first conduit wherein the total number of fuel and combustion gas conduits is at least three and each of said conduits are mutually exterior to each of said other conduits, said combustion gas conduit having a plurality of second oepnings spaced along said combustion gas conduit such that each of second openings is paired with a corresponding first opening; and
means forming mixing chambers spaced along said conduits at each of said pairs of first and second openings to combine said fuel and gas.

16. The burner as in claim 1 further including a plurality of fuel conduits and combustion gas conduits wherein each of said conduits is exterior to all of the other of said conduits and a fuel supply conduit and a combustion gas supply conduit wherein an end of each of said fuel conduits and said gas conduits is connected to one of said fuel supply conduit or said gas supply conduit, respectively, so as to supply fuel or gas to each of said fuel conduits or gas conduits from said fuel supply conduit or said gas supply conduit.

* * * * *